United States Patent
Ahn

(10) Patent No.: US 8,529,080 B2
(45) Date of Patent: Sep. 10, 2013

(54) LAMP FIXING MEMBER, BACKLIGHT ASSEMBLY HAVING THE SAME, AND DISPLAY APPARATUS HAVING THE BACKLIGHT ASSEMBLY

(75) Inventor: Joon Seok Ahn, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 682 days.

(21) Appl. No.: 11/900,962

(22) Filed: Sep. 14, 2007

(65) Prior Publication Data

US 2008/0068835 A1 Mar. 20, 2008

(30) Foreign Application Priority Data

Sep. 14, 2006 (KR) .................. 10-2006-0088991

(51) Int. Cl.
*G09F 13/04* (2006.01)
*G09F 13/08* (2006.01)

(52) U.S. Cl.
USPC .......... 362/97.2; 362/225; 362/260; 362/614; 362/634

(58) Field of Classification Search
USPC .............. 362/225, 260, 614, 634, 97.1–97.2; 349/58, 60, 70
See application file for complete search history.

(56) References Cited

U.S. PATENT DOCUMENTS

| 6,762,806 B1* | 7/2004 | Matsuo et al. | 349/58 |
| 2004/0001340 A1* | 1/2004 | Shin | 362/225 |
| 2004/0156183 A1* | 8/2004 | Kim | 362/31 |

FOREIGN PATENT DOCUMENTS

JP 2002-324425 11/2002

OTHER PUBLICATIONS

Office Action issued in corresponding Korean Patent Application No. 10-2006-0088991, mailed Jan. 14, 2013.

* cited by examiner

*Primary Examiner* — Jason Moon Han
(74) *Attorney, Agent, or Firm* — Brinks Hofer Gilson & Lione

(57) ABSTRACT

Provided are a lamp fixing member, a backlight assembly having the same, and a display apparatus having the backlight assembly. The lamp fixing member includes a body that has a shape corresponding to a shape of the outer surface of the lamp, wherein a portion of the body is opened for fixing the outer surface of the lamp, and a fixing portion that has a coupling hole for fixing the body, the fixing portion being coupled to the body. It is possible to more easily couple and/or separate the lamps by means of the lamp fixing member which is easily fixed to a designated location of the lamp, and to couple the lamps at designated locations.

13 Claims, 6 Drawing Sheets

US 8,529,080 B2

LAMP FIXING MEMBER, BACKLIGHT ASSEMBLY HAVING THE SAME, AND DISPLAY APPARATUS HAVING THE BACKLIGHT ASSEMBLY

This application claims the benefit of Korean Patent Application No. 088991/2006, filed in Korea on Sep. 14, 2006, which is hereby incorporated by reference for all purposes as if fully set forth herein.

BACKGROUND OF THE INVENTION

1. Field of the Invention

The present invention relates to a lamp fixing member, a backlight assembly having the same, and a display apparatus having the backlight assembly.

2. Description of the Related Art

Recently, information processing apparatuses for processing massive data in a short time, and display apparatuses displaying the data processed at the information processing apparatuses as an image have been actively developed.

As a representative display apparatus, there are a liquid crystal display (LCD) device, an organic light emitting device, a plasma display panel (PDP), and so forth. Among them, the organic light emitting device displays an image using light emitted from an organic light emitting layer, and the PDP displays an image using plasma generated internally. Meanwhile, the LCD device displays an image using light provided to liquid crystals of an LCD panel from the outside. That is, the LCD device requires external light for generating the image.

To generate the image from the LCD device, most of the LCD devices include a backlight assembly for providing light to the liquid crystals.

The backlight assembly includes a light source, and optical members improving brightness and brightness uniformity of light generated from the light source.

Examples of the light source used in the backlight assembly may include a light emitting diode (LED), a cold cathode fluorescent lamp (CCFL), a hot cathode florescent lamp (HCFL), a flat fluorescent lamp (FFL), and the like.

Examples of the optical members employed in the backlight assembly may include a light guide plate, a diffusion plate, a diffusion sheet, a prism sheet, and the like.

Recently, as a diagonal length of a display screen in the LCD device becomes greater, more light sources are mounted on the backlight assembly. Particularly, in case of using the CCFL or the HCFL as the light source, a plurality of CCFLs or HCFLs may be disposed in parallel inside a receiving container receiving a display panel.

Thus, since the lamps disposed under the display panel may be easily damaged due to vibration and/or impact applied from the outside, rings are generally disposed on outer surfaces of the lamps for absorbing the impact. The rings inserted onto the outer surfaces of the lamps for absorbing the impact mostly include elastic materials having elasticity.

However, since the rings absorbing the impact and/or vibration applied to the lamps comprise the elastic materials, it is difficult to accurately dispose the lamps at designated locations. Moreover, the rings should be assembled onto every lamp, which causes assembly time to be increased, and also causes assembly failures to frequently occur.

SUMMARY OF THE INVENTION

Accordingly, the present invention is directed to a lamp fixing member, a backlight assembly having the same, and a display apparatus having the backlight assembly that substantially obviate one or more problems due to limitations and disadvantages of the related art.

An object of the present invention is to provide a lamp fixing member that can be coupled to designated locations of lamps.

Another object of the present invention is to provide a backlight assembly including the lamp fixing member.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a lamp fixing member fixing an outer surface of a lamp, the lamp fixing member including: a body having a shape corresponding to a shape of the outer surface of the lamp, wherein a portion of the body is opened for fixing the outer surface of the lamp; and a fixing portion having a coupling hole for fixing the body, the fixing portion being coupled to the body.

In another aspect of the present invention, there is provided a backlight assembly including: a lamp generating light; a lamp fixing member including a body having a shape corresponding to a shape of an outer surface of the lamp, an extension portion extended from the body, and a fixation hole disposed at an end of the extension portion, wherein the body has an opened portion; and a lamp support unit including a support member with a first receiving groove for receiving a lower portion of the body into which the lamp is inserted.

In further another aspect of the present invention, there is provided a display apparatus including: lamps having a cylindrical shape; lamp fixing members coupled to both ends of an outer surface of each of the lamps, each of the lamp fixing members including a body having an annular ring shape of which a portion is opened such that the body is coupled to the both ends of the outer surface of the lamp, an extension portion extended from the body, and a fixation hole disposed at an end of the extension portion; a lamp-support unit including first lamp support members having first receiving grooves for receiving lower portions of the bodies respectively coupled to the both ends of the outer surfaces of the lamps, and second lamp support members having second receiving grooves for receiving upper portions of the bodies into which the lamps are inserted; a bottom receiving container for receiving the lamp support unit; an optical member disposed over the lamps, and fixed to the bottom receiving container; and a display panel disposed over the optical member to display an image by light generated from the lamp.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, although a lamp fixing member, a backlight assembly having the same, and a display apparatus having the backlight assembly according to embodiments will be described in detail with reference to accompanying drawings, the present invention is not limited to following embodiments. Rather, it will be understood by those skilled in the art that various changes in form and details may be made therein without departing from the spirit and scope of the invention.

Lamp Fixing Member

Figure 1:
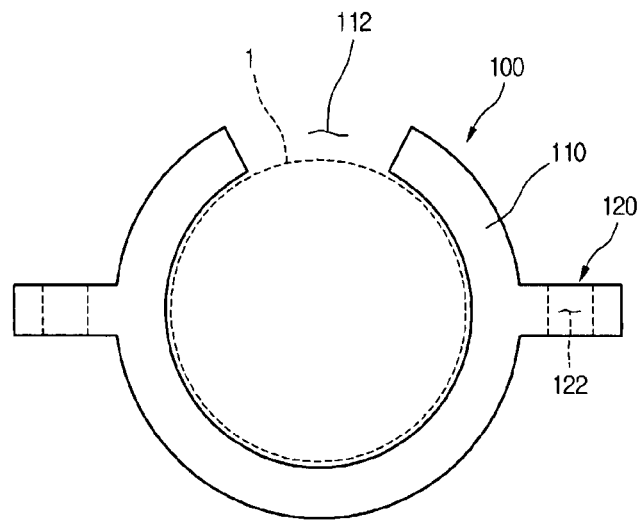
FIG. 1 is a plan view of a lamp fixing member according to a first embodiment.

FIG. 1 is a plan view of a lamp fixing member according to a first embodiment.

Referring to FIG. 1, the lamp fixing member 100 plays a role in fixing an outer surface of a lamp 1. The lamp fixing member 100 includes a body 110 fixing the outer surface of the lamp 1, and a fixing portion 120 protruding from the body 110 for fixing the body 110. In the present embodiment, the fixing portion 120 may be integrally formed with the body 110.

The body 110, for example, is formed to have a shape corresponding to a shape of the outer surface of the lamp 1. For instance, when the lamp 1 has a cylindrical shape, the body 110 has an annular ring shape corresponding to the shape of the lamp 1.

In order to couple the outer surface of the lamp 1 to the body 110 or to separate the outer surface of the lamp 1 from the body 110, the body 110 has a cut-out portion 112.

When a length of the cut-out portion 112 is smaller than about 20% of a total length of the body 110, it is difficult to couple/separate the outer surface of the lamp 1 to/from the body 110. When a length of the cut-out portion 112 is about 25% of a total length of the body 110 or greater, the coupling force between the body 110 and the outer surface of the lamp 1 is considerably reduced. Therefore, it is preferable that the cut-out portion 112 have a length ranging from about 20% to about 25% of the total length of the body 110.

The fixing portion 120 formed on the outer surface of the body 110 plays a role in fixing the body 110. The fixing portion 120 may further include a coupling hole 122 for fixing the body 110.

In the present embodiment, the fixing portion 120 for fixing the body 110 may be formed on the body 110 singly or in plurality. For instance, the fixing portion 120 may be formed in duplicate on the body 110 for more strongly fixing the body 110. In the present embodiment, two fixing portions 120 are disposed on the body 110.

In the present embodiment, the body 110 and the fixing portion 120 formed integrally with the body 110 may include elastic materials having elasticity.

Figure 2:
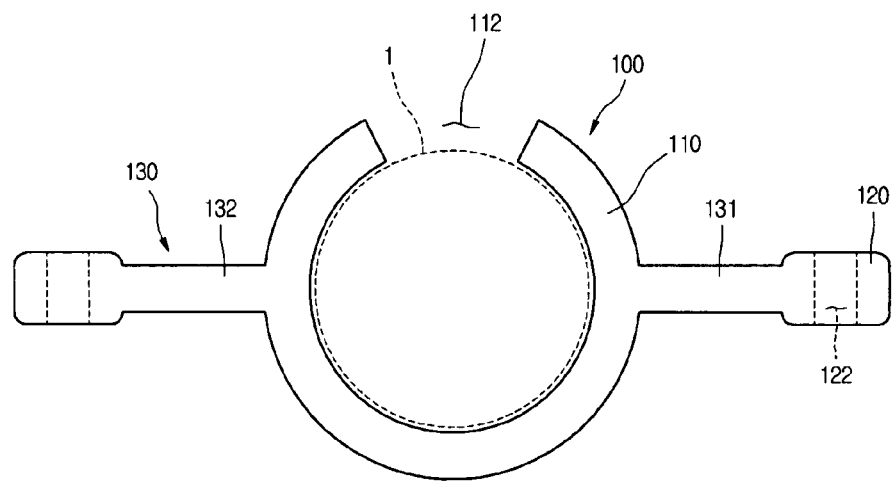
FIG. 2 is a plan view of a lamp fixing member according to a second embodiment.

FIG. 2 is a plan view of a lamp fixing member according to a second embodiment. The lamp fixing member according to the second embodiment is substantially the same as that of the first embodiment except for a coupling portion. Therefore, an overlapping description for the same elements will be omitted herein, and like reference numerals denote like elements.

Referring to FIG. 2, the lamp fixing member 100 plays a role in fixing an outer surface of a lamp 1. The lamp fixing member 100 includes a body 110 for fixing the outer surface of the lamp 1, a fixing portion 120 for fixing the body 110, and a coupling portion 130 for coupling the fixing portion 120 to the body 110.

At least one coupling portion 130 is coupled to the body 110. The coupling portion 130 serves a role of coupling the body 110 and the fixing portion 120 to each other.

In the present embodiment, for example, a first coupling portion 131 and a second coupling portion 132 are formed on an outer surface of the body 110. In the present embodiment, the first and second coupling portions 131 and 132 are disposed such that they are symmetric to each other with reference to the body 110. Meanwhile, in the present embodiment, the body 110 and the coupling portion 130 may be alternately arranged in plurality, and the fixing portion 120 is formed at ends of the coupling portion 130. The fixing portion 120, for example, is formed at respective ends of the first and second coupling portions 131 and 132.

The fixing portion 120 formed integrally on the coupling portion 130 plays a role in fixing the body 110 and the coupling portion 130. The fixing portion 120 may further include a coupling hole 122 for fixing the body 110 and the coupling portion 130.

Figure 3:
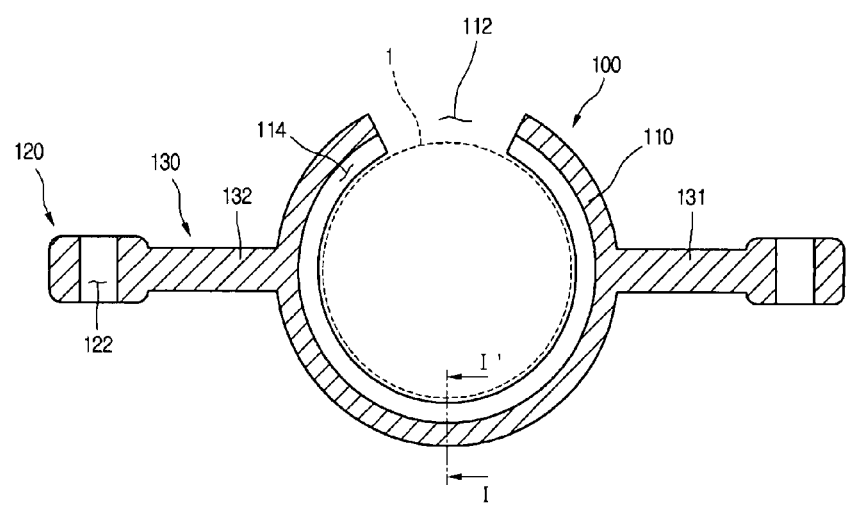
FIG. 3 is a sectional view of a lamp fixing member according to a third embodiment.
Figure 4:
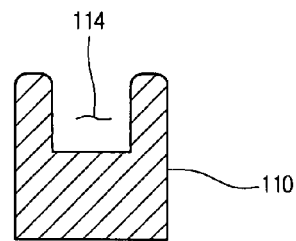
FIG. 4 is a sectional view taken along line I-I' of FIG. 3.

FIG. 3 is a sectional view of a lamp fixing member according to a third embodiment. FIG. 4 is a sectional view taken along line I-I' of FIG. 3. The lamp fixing member according to the third embodiment substantially has the same constitution as that of the previously described second embodiment except for a body. Therefore, the same designations and reference numerals denote the same elements.

Referring to FIGS. 3 and 4, the lamp fixing member 100 includes a body 110, a fixing portion 120, and a coupling portion 130.

A concave groove-shaped recess 114 is formed on an inner surface of the body 110 facing an outer surface of a lamp 1. The recess 114 may be formed along the inner surface of the body 110. Alternatively, the recess 114 may be formed in plurality on the inner surface of the body 110 at designated intervals.

In the present embodiment, the groove-shaped recess 114 formed on the inner surface of the body 110 facing an outer surface of the lamp 1 reduces a contact area between the lamp 1 and the body 110 to thereby rapidly radiate heat generated from the lamp 1 to the outside through a cut-out portion 112, which results in improving the photogeneration efficiency of the lamp 1.

Figure 5:
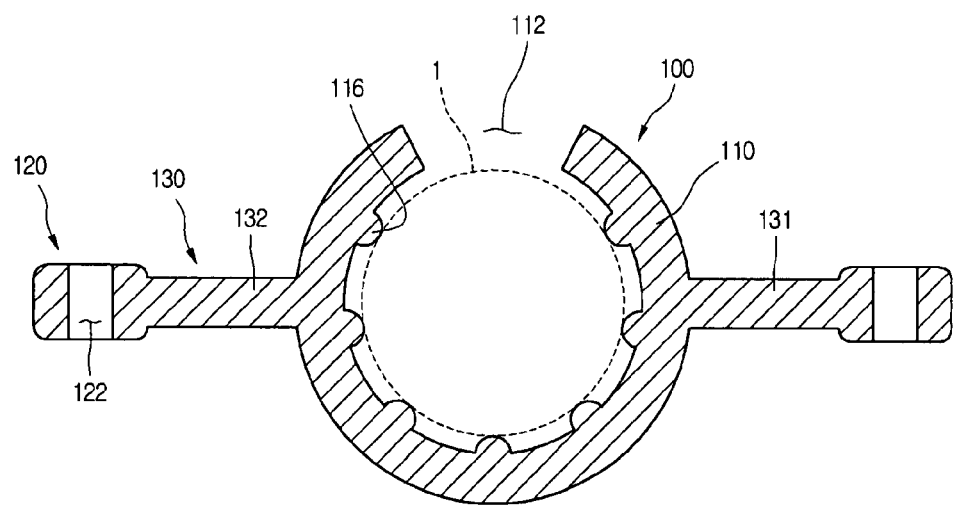
FIG. 5 is a sectional view of a lamp fixing member according to a fourth embodiment.

FIG. 5 is a sectional view of a lamp fixing member according to a fourth embodiment. The lamp fixing member according to the fourth embodiment substantially has the same constitution as that of the above-described second embodiment except for a body. Therefore, the same designations and reference numerals denote the same elements.

Referring to FIG. 5, the lamp fixing member 100 includes a body 110, a fixing portion 120, and a coupling portion 130.

A plurality of protrusions 116 are formed on an inner surface of the body 110 facing an outer surface of the lamp 1.

The protrusions 116 may be formed along the inner surface of the body 110 at designated intervals.

In the present invention, the protrusions 116 formed on the inner surface of the body 110 facing the outer surface of the lamp 1 reduces a contact area between the lamp 1 and the body 110 without the decrease of the coupling force therebetween to thereby rapidly radiate heat generated from the lamp 1 to the outside, which results in improving the efficiency of the lamp 1.

In the present embodiment, the protrusions 116 may have a hemispherical shape.

Backlight Assembly

Figure 6:
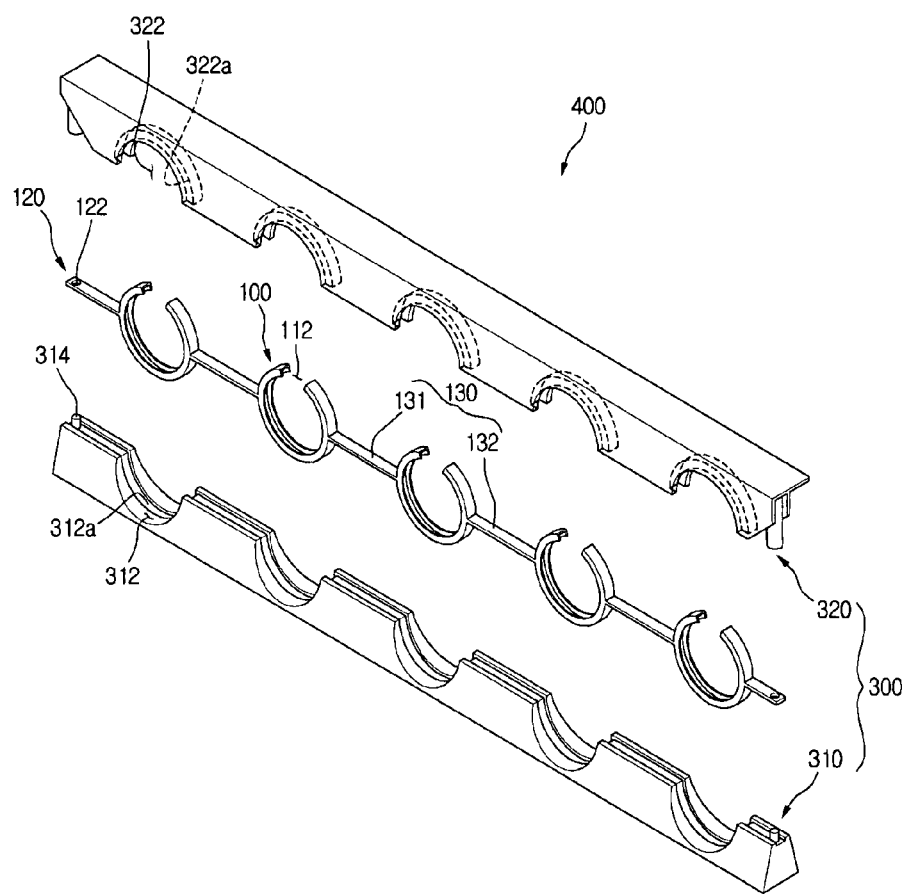
FIG. 6 is an exploded perspective view illustrating a lamp fixing member and a lamp support unit of a backlight assembly according to a fifth embodiment.
Figure 7:
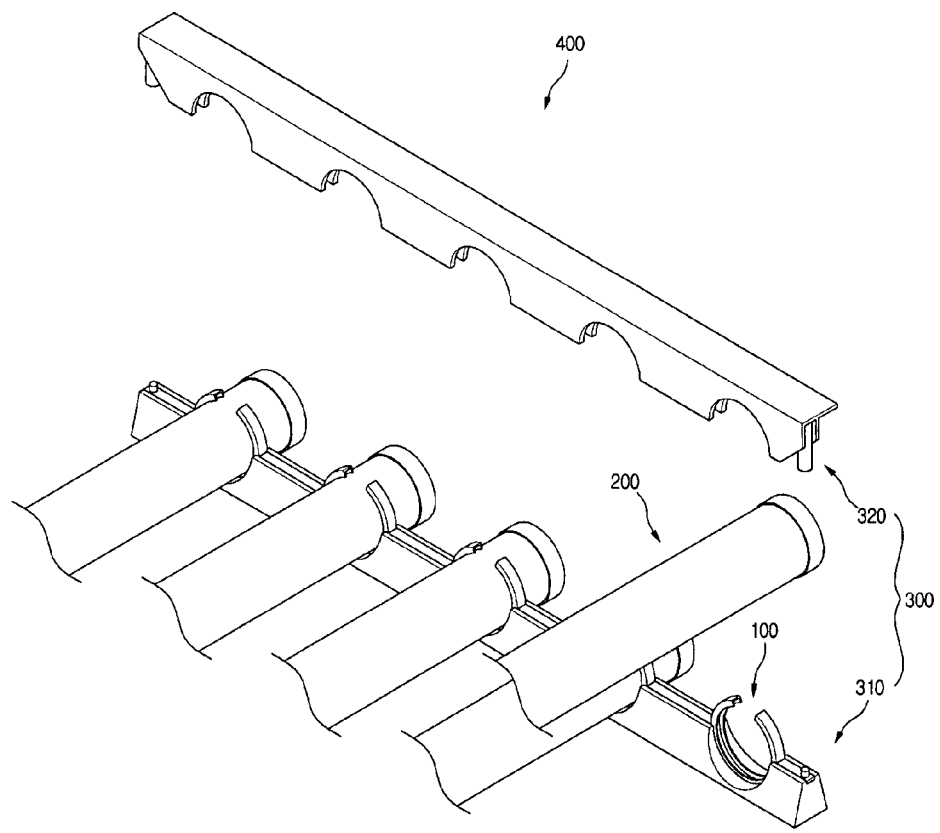
FIG. 7 is an exploded perspective view illustrating the coupling of a lamp and the lamp fixing member of FIG. 6.

FIG. 6 is an exploded perspective view illustrating a lamp fixing member and a lamp support unit of a backlight assembly according to a fifth embodiment. FIG. 7 is an exploded perspective view illustrating the coupling of a lamp and the lamp fixing member of FIG. 6.

Referring to FIGS. 6 and 7, the backlight assembly 400 includes a lamp 200, a lamp fixing member 100, and a lamp support unit 300.

The lamp 200, for example, may have a cylindrical shape, and white light is generated from the lamp 200. In the present embodiment, a diameter of the lamp 200 may be in the range of several micrometers to several tens of micrometers. For instance, the lamp 200 may be a cold cathode fluorescent lamp (CCFL) or a hot cathode florescent lamp (HCFL). In the present embodiment, the lamp 200 is provided in plurality such that the plurality of lamps 200 is arranged in parallel.

The lamp fixing member 100 plays a role in fixing the outer surfaces of the lamps 200 arranged in parallel. The lamp fixing member 100 includes a body 110 fixing the outer surface of the lamp 200, a coupling portion 130, and a fixing portion 120 for fixing the body 110 and the coupling portion 130.

The body 110, for example, has a shape corresponding to a shape of the outer surface of the lamp 200. For instance, when the lamp 200 has a cylindrical shape, the body 110 has an annular ring shape corresponding to the shape of the lamp 200. In the present embodiment, the number of the body 110 corresponds to the number of the lamp 200. That is, when the lamp 200 is configured with N number of lamps, the body 110 fixing the lamp 200 is also configured with N number of bodies, where N is a natural number.

In order to couple the outer surface of the lamp 200 to the body 110 or to separate the outer surface of the lamp 200 from the body 110, a cut-out portion 112 is formed in each body. In the present embodiment, when a length of the cut-out portion 112 is smaller than about 20% of a total length of the body 110, it is difficult to couple/separate the outer surface of the lamp 200 to/from the body 110. When a length of the cut-out portion 112 is about 25% of a total length of the body 110 or greater, the coupling force between the body 110 and the outer surface of the lamp 200 is considerably reduced.

Therefore, it is preferable that the cut-out portion 112 have a length ranging from about 20% to about 25% of the total length of the body 110 so as to couple/separate the outer surface of the lamp 200 to/from the body 110.

In the present embodiment, a concave groove or a plurality of convex protrusions may be formed on an inner surface of the body 110 contacting the outer surface of the lamp 200 so as to radiate the heat generated from the lamp 200.

The coupling portion 130 couples a plurality of the bodies 110 to each other. A first coupling portion 131 and a second coupling portion 132 are respectively formed on the outer surface of the body 110 for coupling the plurality of the bodies 110 to each other.

In the present embodiment, the first and second coupling portions 131 and 132 are disposed such that they are symmetric to each other with reference to the body 110.

The fixing portions 120 are formed at both ends of the coupling portion 130. For example, the fixing portions 120 are formed at respective ends of the first and second coupling portions 131 and 132.

The fixing portion 120 formed integrally on the coupling portion 130 serves a role of fixing the body 110 and the coupling portion 130. The fixing portion 120 may further include a coupling hole 122 for fixing the body 110 and the coupling portion 130.

The lamp support unit 300 fixes the lamp fixing member 100 to which the lamp 200 is coupled. The lamp support unit 300 may include a support member 310 for supporting the lamp 200.

The support member 310 has a first receiving groove 312 for receiving the body 110 of the lamp fixing member 100 with the lamp 200 inserted and the lamp 200. The first receiving groove 312 has a shape corresponding to the shape of the body 110 of the lamp fixing member 100. Also, the first receiving groove 312 corresponds to a position of the lamp 200 fixed to the lamp fixing member 100.

The support member 310 includes a coupling protrusion 314 coupled with the coupling hole 122 formed in the fixing portion 120 of the lamp fixing member 100. The coupling protrusion 314 formed on the support member 310 and the fixing portion 120 formed on the lamp fixing member 100 are coupled to each other so that the lamp fixing member 100 with the lamp 200 coupled is strongly coupled to the support member 310.

Meanwhile, although the lamp 200 can be strongly fixed through the lamp fixing member 100 coupled to the support member 310, the lamp fixing member 100 may be separated from the support member 310 when excessive impact and/or vibration is applied to the support member 310.

To prevent this, a first coupling groove 312a, into which a lower portion of the body 110 of the lamp fixing member 100 is inserted, is formed in the first receiving groove 312. As the lower portion of the body 110 is inserted into the first coupling groove 312a, it is possible to prevent the body 110 and the lamp 200 from being separated from the support member 310.

Meanwhile, in order to prevent the lamp 200 and the lamp fixing member 100 from being separated from the support member 310, a cover member 320 may be disposed over the support member 310.

The cover member 320 includes a second receiving groove 322 for receiving the body 110 of the lamp fixing member 100 with the lamp 200 inserted and an upper portion of the lamp 200. The second receiving groove 322 has a shape corresponding to an upper portion of the body 110 of the lamp fixing member 100. In addition, the second receiving groove 322 corresponds to a position of each of the lamps 200 fixed to the lamp fixing member 100.

The cover member 320 has a coupling hole coupled with the coupling protrusion 314 formed on the support member 310. The coupling hole formed on the cover member 320 and the coupling protrusion formed on the support member 310 are coupled to each other so that the lamp fixing member 100 and the lamp 200 are strongly coupled by means of the support member 310 and the cover member 320.

Meanwhile, a second coupling groove 322a, into which the upper portion of the body 110 of the lamp fixing member 100 is inserted, is formed in the second receiving groove 322 of the cover member 320. As the upper portion of the body 110 is inserted into the second coupling groove 322a, it is possible to prevent the lamp fixing member 100 from being separated from the cover member 320.

Display Apparatus

Figure 8:
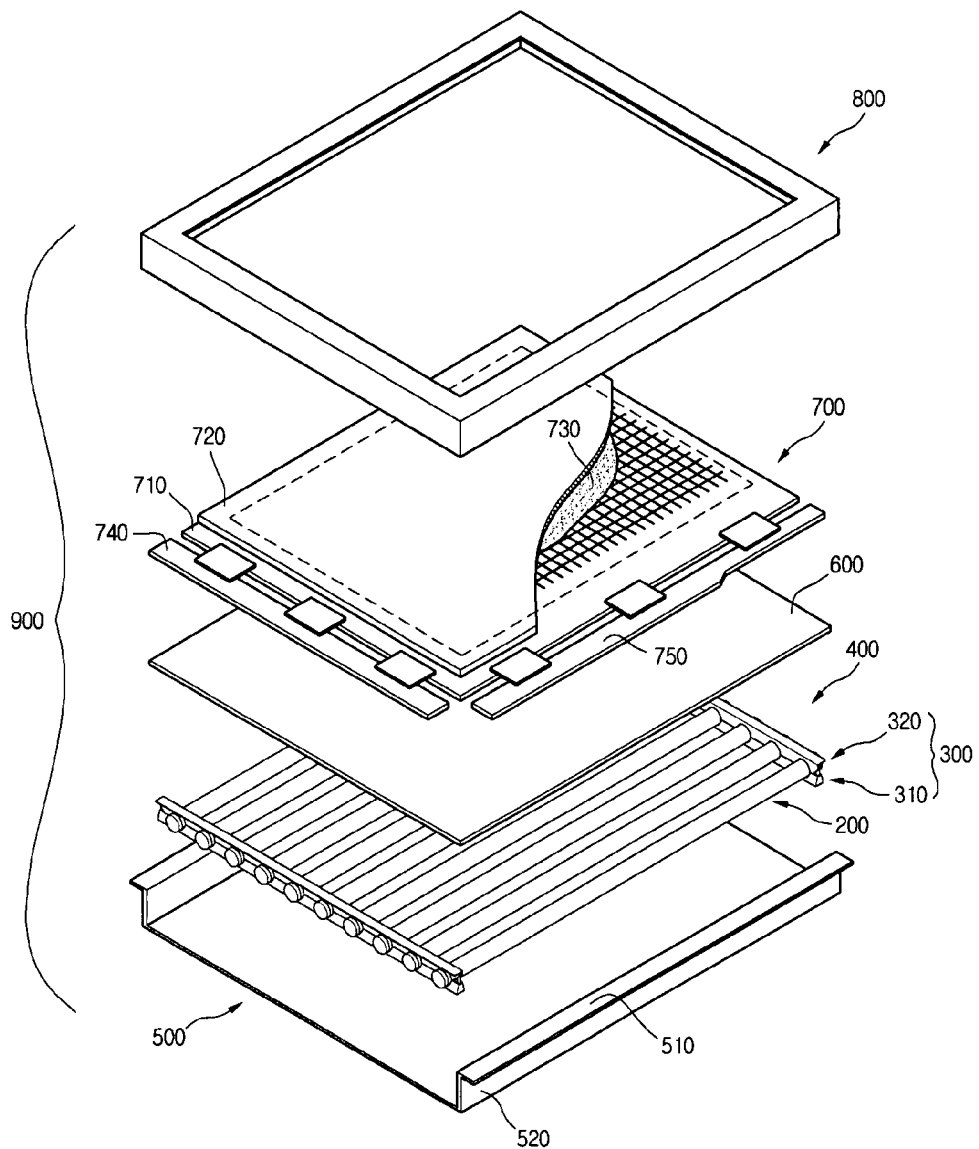
FIG. 8 is an exploded perspective view of a display apparatus according to a sixth embodiment.

FIG. 8 is an exploded perspective view of a display apparatus 900 according to a sixth embodiment.

Referring to FIG. 8, the display apparatus 900 includes lamps 200, a lamp fixing member 100, a lamp support unit 300, a bottom receiving container 500, an optical member 600, a display panel 700, and a case top 800.

Referring to FIGS. 6 and 8, the lamp 200 has a cylindrical shape, and white light, for example, is generated from the lamp 200 having the cylindrical shape. The lamp 200 has a diameter ranging from several micrometers to several tens of micrometers. In the present embodiment, the lamp 200 may be, for instance, a CCFL or an HCFL. In the present embodiment, the lamp 200 is provided in plurality such that the plurality of lamps 200 is arranged in parallel.

Referring to FIG. 6, the lamp fixing member 100 is coupled to the outer surfaces of the plurality of lamps 200 arranged in parallel. The lamp fixing member 100 includes a body 110 fixing the outer surface of the lamp 200, a coupling portion 130, and a fixing portion 120 for fixing the body 110 and the coupling portion 130.

The body 110, for example, has a shape corresponding to a shape of the outer surface of the lamp 200. For instance, when the lamp 200 has a cylindrical shape, the body 110 has an annular ring shape corresponding to the shape of the lamp 200. In the present embodiment, the number of the body 110 corresponds to the number of the lamp 200. That is, when the lamp 200 is provided in plurality, the body 110 fixing the lamp 200 is also provided in plurality.

In order to couple the outer surface of the lamp 200 to the body 110 or to separate the outer surface of the lamp 200 from the body 110, the body has a cut-out portion 112 by cutting a portion of the body 110.

It is preferable that the cut-out portion 112 have a length ranging from about 20% to about 25% of the total length of the body 110 so as to couple/separate the outer surface of the lamp 200 to/from the body 110. In the present embodiment, when a length of the cut-out portion 112 is smaller than about 20% of a total length of the body 110, it is difficult to couple/separate the outer surface of the lamp 200 to/from the body 110. When a length of the cut-out portion 112 is about 25% of a total length of the body 110 or greater, the coupling force between the body 110 and the outer surface of the lamp 200 is considerably reduced.

In the present embodiment, a concave groove or a plurality of convex protrusions may be formed on an inner surface of the body 110 contacting the outer surface of the lamp 200 to radiate the heat generated from the lamp 200.

The coupling portion 130 couples the plurality of bodies 110 to each other. A first coupling portion 131 and a second coupling portion 132 are respectively formed on the outer surface of the body 110 to couple the plurality of bodies 110 to each other.

In the present embodiment, the first and second coupling portions 131 and 132 are disposed such that they are symmetric to each other with reference to the body 110.

The fixing portions 120 are formed at ends of the coupling portion 130. The fixing portions 120, for example, are formed at respective ends of the first and second coupling portions 131 and 132.

The fixing portion 120 formed integrally on the coupling portion 130 serves a role of fixing the body 110 and the coupling portion 130. The fixing portion 120 may further include a coupling hole 122 for fixing the body 110 and the coupling portion 130.

The lamp support unit 300 fixes the lamp fixing member 100 to which the lamp 200 is coupled. To fix the lamp-fixing member 100, the lamp support unit 300 may include a support member 310 supporting the lamp 200.

The support member 310 has a first receiving groove 312 for receiving a lower portion of the body 110 of the lamp fixing member 100 with the lamp 200 inserted. The first receiving groove 312 has a shape corresponding to the shape of the body 110 of the lamp fixing member 100. In addition, the first receiving groove 312 corresponds to a position of the lamp 200 fixed to the lamp fixing member 100.

The support member 310 includes a coupling protrusion 314 coupled with the coupling hole 122 formed in the fixing portion 120 of the lamp fixing member 100. The coupling protrusion 314 formed on the support member 310 and the fixing portion 120 formed on the lamp fixing member 100 are coupled to each other so that the lamp fixing member 100 with the lamp 200 coupled is strongly coupled to the support member 310.

Meanwhile, although the lamp 200 can be strongly fixed through the lamp fixing member 100 coupled to the support member 310, the lamp fixing member 100 may be separated from the support member 310 when excessive impact and/or vibration is applied to the support member 310.

To prevent this, a first coupling groove 312a, into which a lower portion of the body 110 of the lamp fixing member 100 is inserted, is formed in the first receiving groove 312. As the lower portion of the body 110 is inserted into the first coupling groove 312a, it is possible to prevent the body 110 and the lamp 200 from being separated from the support member 310.

Meanwhile, in order to prevent the lamp 200 and the lamp fixing member 100 from being separated from the support member 310, a cover member 320 may be disposed over the support member 310.

The cover member 320 includes a second receiving groove 322 for receiving an upper portion of the body 110 of the lamp fixing member 100 with the lamp 200 inserted. The second receiving groove 322 has a shape corresponding to the upper portion of the body 110 of the lamp fixing member 100. Also, the second receiving groove 322 corresponds to each of the lamps 200 fixed to the lamp fixing member 100.

The cover member 320 has a coupling hole coupled with the coupling protrusion 314 formed on the support member 310. The coupling hole formed on the cover member 320 and the coupling protrusion formed on the support member 310 are coupled to each other so that the lamp fixing member 100 and the lamp 200 are strongly coupled by means of the support member 310 and the cover member 320.

Meanwhile, a second coupling groove 322a, into which the upper portion of the body 110 of the lamp fixing member 100 is inserted, is formed in the second receiving groove 322 of the cover member 320. As the upper portion of the body 110 is inserted into the second coupling groove 322a, it is possible to prevent the lamp fixing member 100 from being separated from the cover member 320.

The bottom receiving container 500 receives the lamp support unit 300 coupled to the lamp fixing member 100 with the lamp 200 coupled. The bottom receiving container 500 has a bottom surface 510, and sidewalls extended from an edge of the bottom surface 510, which provides a receiving space over the bottom surface 510.

Referring to FIG. 8, the optical member 600 is disposed over the bottom receiving container 500. The optical member 600 further improves the characteristic of light generated from the lamps 200 fixed by the lamp fixing member 100 and the lamp support unit 300. The optical member 600 may include a light guide plate for improving brightness uniformity of light generated from the lamps 200, a diffusion sheet disposed over the light guide plate for diffusing light emitted from the light guide plate, and a prism sheet disposed over the diffusion sheet for condensing the diffused light.

The display panel 700 includes a thin film transistor (TFT) substrate 710, a color filter substrate 720, and a liquid crystal layer 730 interposed between the TFT substrate 710 and the color filter substrate 720. The TFT substrate 710 is configured with TFTs and a pixel electrode connected to the respective TFTs. The color substrate 720, which is disposed opposite to the TFT substrate 710, includes color filters. Reference numerals 740 and 750 denote circuit boards that are disposed on the TFT substrate 710, and provide driving signals to the TFT substrate 710.

The case top 800 prevents the display panel 700, the optical member 600, and the lamp support unit 300 with the lamp 200 fixed from being separated from the bottom receiving container 500. The case top 800 is coupled to the bottom receiving container 500.

As described above in detail, according to the embodiments, it is possible to more easily couple and/or separate lamps by means of a lamp fixing member which is easily fixed to a designated location of the lamp, and to couple the lamps at designated locations.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A lamp fixing member fixing an outer surface of a lamp, the lamp fixing member comprising:
    a first body that has a shape corresponding to a shape of the outer surface of the lamp and having an upwardly open cut-out portion that receives an outer surface of a lamp; and
    a first fixing member including a free end having a coupling hole for fixing the first body and another end coupled to a first side of a portion of an outer surface of the first body, wherein the fixing portion protrudes from the portion of the outer surface of the first body toward one end of the lamp fixing member;
    a second body arranged to be adjacent to a second side of the first body which is opposite to the first side where the first fixing member protrudes;
    a first coupling member including one end formed on the second side of the first body and having another end formed on a third side of the second body which faces the second side of the first body, the first coupling member coupling the first body and the second body by extending from the second side of the first body to the third side of the second body;
    a third body arranged to be adjacent to a fourth side of the second body which is opposite to the third side of the second body;
    a second coupling member having one end formed on the fourth side of the outer surface of the second body and another end formed on a fifth side of the outer surface of the third body, the second coupling member coupling the second body and the third body by extending from the fourth side of the second body to the fifth side of the third body;
    a second fixing member including one end formed on a sixth side of the third body which is opposite to the fifth side and another free end having a coupling hole for fixing the third body, the second fixing member being coupled to the sixth side of the outer surface of the third body and protruding from the outer surface of the third body toward the other end of the lamp fixing member;
    wherein each inner surface of the first body, the second body and the third body comprises a plurality of convex protrusions, each inner surface contacting the outer surface of the lamp,
    wherein the first, the second and the third body have substantially identical shape and size, and the first and the second coupling members are symmetric with respect to the second body.

2. The lamp fixing member according to claim 1, wherein the cut-out portion of the first body is in the range of about 20% to about 25% of a total length of the first body.

3. The lamp fixing member according to claim 1, wherein the first body and the first fixing member comprise an elastic member.

4. The lamp fixing member according to claim 1, wherein the second body comprises a plurality of bodies coupled in series with intervening coupling members, and a total number of bodies of the lamp fixing member corresponds to a number of lamps.

5. The lamp fixing member according to claim 1, wherein an inner surface of the first body comprises a concave groove or a plurality of convex protrusions, the inner surface of the first body contacting the outer surface of the lamp.

6. The lamp fixing member according to claim 1, wherein the first body has an annular ring shape corresponding to a cylindrical shape of the outer surface of the lamp, and a width of the first coupling member and a width of the first fixing member are smaller than or equal to a width of the outer surface of the first body.

7. A backlight assembly comprising:
    a lamp that generates light;
    a lamp fixing member including a body that has a shape corresponding to a shape of an outer surface of the lamp, an extension member extended from the body, and a fixation hole disposed at a free end of the extension member, wherein the body has an upwardly open cut-out portion that receives the lamp and an inner surface of the body comprises a plurality of convex protrusions, the inner surface of the body contacting the outer surface of the lamp; and
    a support member where the lamp fixing member is mounted, the support member comprising:
        a first receiving groove for receiving the lamp and a lower portion of the lamp fixing member which is disposed onto the support member, a portion of the first receiving groove shaped to receive the extension member and another portion of the first receiving groove shaped to receive a lower part of the body and a lower part of the lamp;
        a first coupling groove formed in the first receiving groove for securing the lower part of the body in order to prevent the body and the lamp from being separated from the support member;
        a coupling protrusion arranged in a position that corresponds to that of the fixation hole of the lamp fixing member such that upon mounting the lamp fixing member on the support member, the coupling protrusion upwardly extends through the fixation hole;
    a cover member disposed over the support member and the lamp fixing member and comprising:

a second receiving groove for receiving an upper part of the lamp fixing member and an upper part of the lamp, a portion of the second receiving groove shaped to receive the extension member and another portion of the second receiving groove shaped to receive the upper part of the body and the upper part of the lamp;

a second coupling groove formed in the second receiving groove for securing the upper part of the body in order to prevent the body and the lamp from being separated from the cover member;

a coupling hole arranged in a position corresponding to the coupling protrusion of the support member and the fixation hole of the lamp fixing member such that the coupling protrusion passing through the fixation hole is received in the coupling hole.

8. The backlight assembly according to claim 7, wherein the body comprises a plurality of annular rings cascaded in series via intervening coupling members.

9. The backlight assembly according to claim 8, wherein the intervening coupling members are symmetric with respect to each annular ring.

10. The backlight assembly according to claim 8, wherein each annular ring is spaced apart from neighboring annular rings and the annular rings are arranged in parallel.

11. The backlight assembly according to claim 8, wherein the first receiving groove comprises a first portion that corresponds to a shape of a lower part of the annular ring and a second portion that corresponds to a shape of a lower surface of the intervening coupling members.

12. The backlight assembly according to claim 8, wherein the intervening coupling members comprise strips extended sideway, said strips coupling the annular rings by being attached to two sides of each annular ring at a mid-position of an outer surface of each annular ring.

13. A display apparatus comprising:

a plurality of lamps that has a cylindrical shape;

the backlight assembly according to claim 7;

a bottom receiving container for receiving the support member and the cover member;

an optical member disposed over the lamps, and fixed to the bottom receiving container; and a display panel disposed over the optical member to display an image by light generated from the lamps.

\* \* \* \* \*